United States Patent [19]

Korf

[11] 4,273,883
[45] Jun. 16, 1981

[54] UREA-FORMALDEHYDE POLYMERS HAVING REDUCED FORMALDEHYDE EMISSION AND CELLULAR UREA FORMALDEHYDE FOAM WHICH IS RESISTANT TO ACID-INDUCED HYDROLYSIS

[76] Inventor: Heinz L. Korf, 4394 Beaconshillsfield Ave., Montreal NDG Quebec, Canada

[21] Appl. No.: 133,591

[22] Filed: Apr. 8, 1980

[51] Int. Cl.$^3$ .............................................. C08J 9/30
[52] U.S. Cl. .................................. 521/113; 521/121; 521/188; 528/261; 528/265
[58] Field of Search ............... 521/187, 188, 113, 121; 528/261, 265

[56] References Cited

U.S. PATENT DOCUMENTS

| | | |
|---|---|---|
| 3,160,596 | 12/1964 | Spencer ................................. 521/187 |
| 3,231,363 | 1/1966 | Renner .................................. 521/188 |
| 3,631,134 | 12/1971 | Scheuermann et al. ............. 521/188 |
| 4,208,487 | 6/1980 | Wang et al. ........................... 521/188 |

Primary Examiner—Morton Foelak
Attorney, Agent, or Firm—Seed, Berry, Vernon & Baynham

[57] ABSTRACT

Urea-formaldehyde polymers having reduced formaldehyde emissions are produced by incorporating in the prepolymer an aromatic substance incapable of reacting with urea formaldehyde in alkaline media but capable of reacting with urea formaldehyde in acid media in an amount sufficient to reduce or eliminate the free formaldehyde emissions therefrom. Also disclosed is a cellular urea-formaldehyde foam which is resistant to acid-induced hydrolysis, the foam prepared by incorporating a polyalkyl polynuclear metal sulfonate foaming agent in the acid catalyst solution for the urea-formaldehyde prepolymer.

7 Claims, No Drawings

UREA-FORMALDEHYDE POLYMERS HAVING REDUCED FORMALDEHYDE EMISSION AND CELLULAR UREA FORMALDEHYDE FOAM WHICH IS RESISTANT TO ACID-INDUCED HYDROLYSIS

BACKGROUND OF THE INVENTION

1. Field of the Invention

This invention relates to urea-formaldehyde polymers having reduced formaldehyde emissions, to urea-formaldehyde cellular foams incorporating a foaming agent which inhibits acid-induced hydrolysis of the foam and to methods of making each of the above.

2. Prior Art Relating to the Disclosure

Urea formaldehyde resins are generally prepared by the acid catalyzed reaction of urea and formaldehyde. Such urea-formaldehyde resins contain amide linkages which are capable of hydrolysis and are therefore intrinsically unstable in the presence of water. Such hydrolysis generates low molecular weight material which is believed to liberate formaldehyde. It is also known that the inherent residual acidity in urea-formaldehyde polymers prepared using an acid catalyst is a critical factor in the hydrolytic breakdown of such polymers. The emission of formaldehyde from urea-formaldehyde resins and products incorporating urea-formaldehyde resins is and continues to be a problem. Numerous methods have been proposed to reduce the formaldehyde content of such resins, such as by use of one or more aryl dialdehydes having 2–8 carbon atoms provided as a cross-linking solution at the time of final polymer formation (U.S. Pat. No. 4,129,533). Also disclosed are calcium lignosulfonates, furfuryl alcohol, resorcinol and the addition of free urea to the catalyst solution during manufacture of urea-formaldehyde foams.

Urea-formaldehyde resins are widely employed in wood products, for example, in the manufacture of interior plywood and particleboard. Such resins are also widely used in the form of foams for insulation purposes. For such use urea-formaldehyde resins are formulated to produce a rapidly setting, low density foam having a low shrinkage made by mixing together two main components with aeration, the components including (1) an aqueous solution of a urea formaldehyde resin prepolymer and (2) an aqueous solution of a surfactant and a strong acid catalyst. Resin foams prepared as described are injected into the walls of dwelling units with specially designed equipment where they cure in place. The resins rapidly gel when placed in contact with acidic catalyst to produce highly cross-linked insoluble polymer. Typically, the urea-formaldehyde resins have a molar ratio of formaldehyde to urea ranging from 1.0:1.0 to 2.5:1.0, preferably 1.0 to 1.3:1.6. There is generally some unreacted monomer in the finally cured urea-formaldehyde resin, this monomer present as free formaldehyde or an N-methylol moiety at the polymer chain ends. During the extreme varying conditions of temperature and humidity to which such foams are exposed when used for insulation purposes in dwelling units, the formaldehyde is emitted as a vapor and can cause objectionable odors.

SUMMARY OF THE INVENTION

It is one object of this invention to produce a urea-formaldehyde cellular foam which is resistant to acid-induced hydrolysis.

It is another object of this invention to produce a cellular urea-formaldehyde foam which is free of formaldehyde odor and resistant to acid-induced hydrolysis.

It is another object of this invention to produce urea-formaldehyde resins in finally cured form which are free of formaldehyde odor.

It is another object of this invention to provide methods of producing urea-formaldehyde resins free of formaldehyde and resistant to acid-induced hydrolysis.

DESCRIPTION OF THE PREFERRED EMBODIMENTS

The manufacture of urea-formaldehyde prepolymers which can be finally cured by the addition of acid or base is well known. In particular, the manufacture of urea-formaldehyde resins useful in the manufacture of urea formaldehyde cellular foams are commercially available and sold under the tradename Rapco foam. Such urea-formaldehyde resins are made by preparing a urea-formaldehyde prepolymer having a molar ratio of urea to formaldehyde ranging from 1.0 to 2.5 moles formaldehyde per mole of urea, a viscosity ranging from 30 to 60 centipoises at 20° C. and a solids content of 35 to 55 weight percent. To finally cure the resins, particularly when used for foamed-in-place insulation systems, an aqueous solution incorporating a strong acid catalyst and a surfactant are mixed with the urea-formaldehyde resin prepolymer in the presence of a foaming agent, such as compressed air. The surfactants which have generally been used for such purposes include aryl sulfonic acids, alkyl aryl sulfonates, alkene polyoxy ethers, sulfonated alkyl phenoxy polyethyleneoxy ethanols and other such surfactants. The use of a strong acid to finally cure the resin causes the finally cured resin or resin foam to be highly acidic and have a high degree of inherent residual acidity subject to hydrolytic degradation of amide linkages and methanol groups and resulting in a continuous emission of formaldehyde vapor. Foams which are acid-free; i.e., which have a pH of about 7, appear to be stable to degradation by hydrolysis with resulting molecular breakdown.

The formation of a chemically and structurally stable urea-formaldehyde foam system is dependent on both the urea-formaldehyde prepolymer used and the surfactant. The urea-formaldehyde prepolymer typically used in production of urea-formaldehyde foams has been described. It has been found that a modified polyalkyl polynuclear metal sulfonate employed as a surfactant along with the acid catalyst results in a foam which is very stable. One such metallic sulfonate which can be used is sold under the trademark "Petro BAF" by Petrochemicals Co. Inc. The surfactant is added to the aqueous catalyst solution in an amount ranging from 1 to 3 percent by weight, based on the weight of the aqueous catalyst solution, either at the time the catalyst solution is to be added to the urea-formaldehyde prepolymer or prior thereto. None of the other surfactants previously mentioned, such as the alkyl aryl sulfonates, are capable of producing urea-formaldehyde foams which are virtually acid-free. Generally, when these conventional foaming agents are used for the preparation of urea-formaldehyde foams, the pH of the resulting foam ranges anywhere from pH 2.5 to pH 4.8 when measured years after the foam was prepared.

The foams incorporating the metal sulfonates described herein produced a urea-formaldehyde foam with excellent buildup characteristics and stability at any pH level. Generally, the surfactants for urea-formaldehyde foam are supplied to foam insulation installers in the form of concentrates to be diluted with specified amounts of water before commencing the foaming operation. Such surfactants are mixed together with water, the acid catalyst and other materials for addition to the urea-formaldehyde prepolymer with the foaming action itself generated by a gas, such as compressed air.

It has also been found that the addition of certain aromatic compounds to the urea-formaldehyde prepolymer in amounts which are dependent on the quantity of free formaldehyde present in the prepolymer, results in a finally cured urea-formaldehyde polymer which, after an initial small release, is substantially free of formaldehyde emission. Generally, the amount of the aromatic compound added to the urea-formaldehyde prepolymer ranges from less than 0.1 percent by weight to 5 percent by weight, based on the total weight of the resin solution; however, more or less can be used depending on the amount of free formaldehyde present in the resin solution. The aromatic compounds which can be used are typified by the mono- or polymethoxylated benzene derivatives. A preferred aromatic compound is p-methoxybenzaldehyde added to the urea-formaldehyde prepolymer in an amount ranging from 0.2 to 2 percent by weight based on the weight of the urea-formaldehyde resin solution, preferably 0.1 to 0.5 percent by weight. The p-methoxybenzaldehyde is added to the urea-formaldehyde prepolymer in a 1 to 5 percent by weight solution of methanol. The aromatic compound is added to the urea-formaldehyde resin solution or, if a powdered urea formaldehyde resin is used, the aromatic compound may be added to the powdered resin at the time it is diluted with water for preparation of a urea-formaldehyde resin solution. In either case, the same beneficial effects of control of formaldehyde emission are obtained. These same results are applicable to aqueous urea formaldehyde resins used widely in the wood products industry as adhesives for particleboard and plywood as well as to insulating foams.

Polyhydric alcohols, carbohydrates or other humectants can also be added to the urea-formaldehyde prepolymer along with the acidic catalyst as shrinkage reducing materials. The addition of 2.5 to 7.5 weight percent of such polyhydric alcohols or carbohydrates as sorbitol, fructose, etc. based on the weight of the aqueous catalyst solution, results in foams having a linear shrinkage of less than 0.8 percent measured as much as 1½ years after preparation.

EXAMPLES

An aqueous formaldehyde resin solution was obtained from Rapco Foam Inc., Costa Mesa, Calif., the resin solution having a molar ratio of formaldehyde to urea of 1.65:1 and a viscosity of 40±5 as measured by a No. 4 cup. P-methoxybenzaldehyde was added to the urea-formaldehyde resin solution, 0.3 weight percent based on the total weight of the resin solution. The resin solution, with the added p-methoxybenzaldehyde, was foamed using a foaming gun and a foaming agent containing a strong acid, a surfactant and water having the following composition:

|  | Weight Percent Based on the Total Weight of the Catalyst Solution |
|---|---|
| Petro BAF | 1.50 |
| Oxalic acid | 0.7 |
| Methanesulfonic acid | 0.25 |
| Resorcinol | 0.75 |
| Sorbitol | 5.00 |
| Water | remainder |

The catalyst solution was introduced into the foaming chamber of the foaming gun where it was mixed with pressurized air. The resulting froth was conveyed to a mixing chamber in the gun where it was mixed with the resin solution. The foam obtained was poured into an open rectangular mold and permitted to dry at constant weight. Two weeks after preparation of the foam, the pH of the foam was pH 6.8. The resulting foam was highly resilient. The foam was exposed for 30 days to a temperature of 160° F. at 90 percent relative humidity without noticeable change of the foam structure. The shrinkage of the foam as measured after this exposure was less than 0.2 percent. Formaldehyde emission was tested by exposing comminuted foam to a temperature of 45° C. and rh 100 percent. Under these conditions the amount of urea-formaldehyde emitted per gram of foam was 1.5, 1.2, 0.6, 0.3, 0.3, 0.0 and 0.0 mg. at the corresponding elapsed time of 1, 3, 6, 14, 20, 27 and 34 days. These are conditions which are not normally encountered in an actual use situation.

I claim:

1. A method of preparing a urea formaldehyde foam that is resistant to acid-induced hydrolysis, comprising: mixing together an aqueous solution of a urea-formaldehyde resin prepolymer to which an amount of p-methoxybenzaldehyde is added which is capable of reacting with acidic but not alkaline solutions of said urea-formaldehyde prepolymer and an acidic catalyst solution containing a polyalkyl polynuclear metal sulfonate surfactant in the presence of a foaming gas, the sulfonate interacting with reactive groups of the prepolymer to give a structurally stable foam and a foam having a substantially neutral pH, thereby inhibiting the effect of acid-induced hydrolysis of the foam.

2. The method of claim 1, wherein the urea-formaldehyde polymer has a molar ratio of formaldehyde to urea ranging from 1:1 to 2.5:1, a viscosity of from 30 to 60 centipoises at 20° F. as measured by a No. 4 cup and a solids content of from 35 to 55 weight percent.

3. The method of claim 1, wherein the surfactant is present in an amount ranging from 1.25 to 3 percent based on the weight of the aqueous catalyst solution.

4. The method of claim 1, wherein the p-methoxybenzaldehyde is added in an amount ranging from 0.1 to 5 percent by weight based on the weight of the resin solution.

5. A urea-formaldehyde foam which is resistant to acid hydrolysis containing a polynuclear polyalkyl metal sulfonate.

6. A urea-formaldehyde foam which has thermal and sound insulation properties prepared from a mixture of an aqueous resin condensate of urea and formaldehyde containing from 1 to 1.5 moles formaldehyde per mole of urea and aqueous catalyst solution containing an acid catalyst, the foam incorporating p-methoxy benzaldehyde which is capable of reacting with acidic but not alkaline solutions of formaldehyde in an amount sufficient to reduce or substantially eliminate formaldehyde vapor emission therefrom and a polyalkyl polynuclear metal sulfonate as a surfactant which inhibits acid-induced hydrolysis of the foam.

7. The foam of claim 6, wherein the p-methoxybenzaldehyde is present in an amount ranging from 0.1 to 5 percent based on the weight of the resin solution and wherein a metal sulfonate surfactant is incorporated in the catalyst solution in an amount ranging from 1.25 to 3 percent based on the weight of the aqueous catalyst solution.

* * * * *